United States Patent

[11] 3,527,201

| [72] | Inventor | Isidore Epstein, New Hyde Park, N.Y. (c/o Creatron Services, Inc., 32 Cherry Lane, Floral Park, N.Y. 11001) |
|---|---|---|
| [21] | Appl. No. | 770,316 |
| [22] | Filed | Oct. 24, 1968 |
| [45] | Patented | Sept. 8, 1970 |

[54] SELF-HEATING CONTAINER
3 Claims, 2 Drawing Figs.

[52] U.S. Cl. .................................................. 126/263, 126/262
[51] Int. Cl. ................................................ A47g 23/04, F24j 1/00
[50] Field of Search ................................... 126/262, 263; 44/3, 3.3

[56] References Cited
UNITED STATES PATENTS

| 2,384,278 | 9/1945 | Caldwell...................... | 126/262 |
| 2,980,103 | 4/1961 | Scribner et al................ | 126/263 |
| 3,173,367 | 3/1965 | Shinpaugh.................... | 44/3X |

FOREIGN PATENTS

| 899,441 | 6/1962 | Great Britain.............. | 126/263 |

*Primary Examiner*—Charles J. Myhre
*Attorney*—Jerome Bauer

ABSTRACT: The present invention provides a self-heating container for food that is obtained by reacting an aluminothermic mixture enclosed in a well in the container. This mixture is ignited by passing an electromotive force through a metal filament in the well which is positioned in contact with a starter mixture.

Patented Sept. 8, 1970

3,527,201

INVENTOR.
ISIDORE EPSTEIN
BY
Jerome Bauer
ATTORNEY

3,527,201

SELF-HEATING CONTAINER

BACKGROUND OF THE INVENTION

There is a need for economical and reliable food containers whereby the food in a can is heated and made ready for serving without the use of any or possibly only simple auxiliary utensils. The need for such self-heating food containers is particularly great for military field use and also for non-military uses at remote locations or for emergency conditions. Proposed self-heating food containers have been expensive and/or unreliable. The present invention provides an economical and reliable self-heating food container.

BRIEF SUMMARY OF INVENTION

The present invention provides a self-heating food container which is hermetically sealed and contains an elongated well having metal walls descending into said container. The well contains a metal filament extending inwardly into said well. The filament circuit terminates in two leads on the surface of the can which are insulated from each other. The well is filled with an aluminothermic mixture comprising aluminum powder and a reducible chromate. A starting mixture containing boron is positioned immediately in contact with said filament. When a small voltage is applied across the two electrical leads, a filament is heated and causes the starting mixture to initiate the aluminothermic mixture to ignite and react producing sufficient heat to raise the temperature of the food in the container.

DETAILED DESCRIPTION OF THE INVENTION

Figures 1, 2:
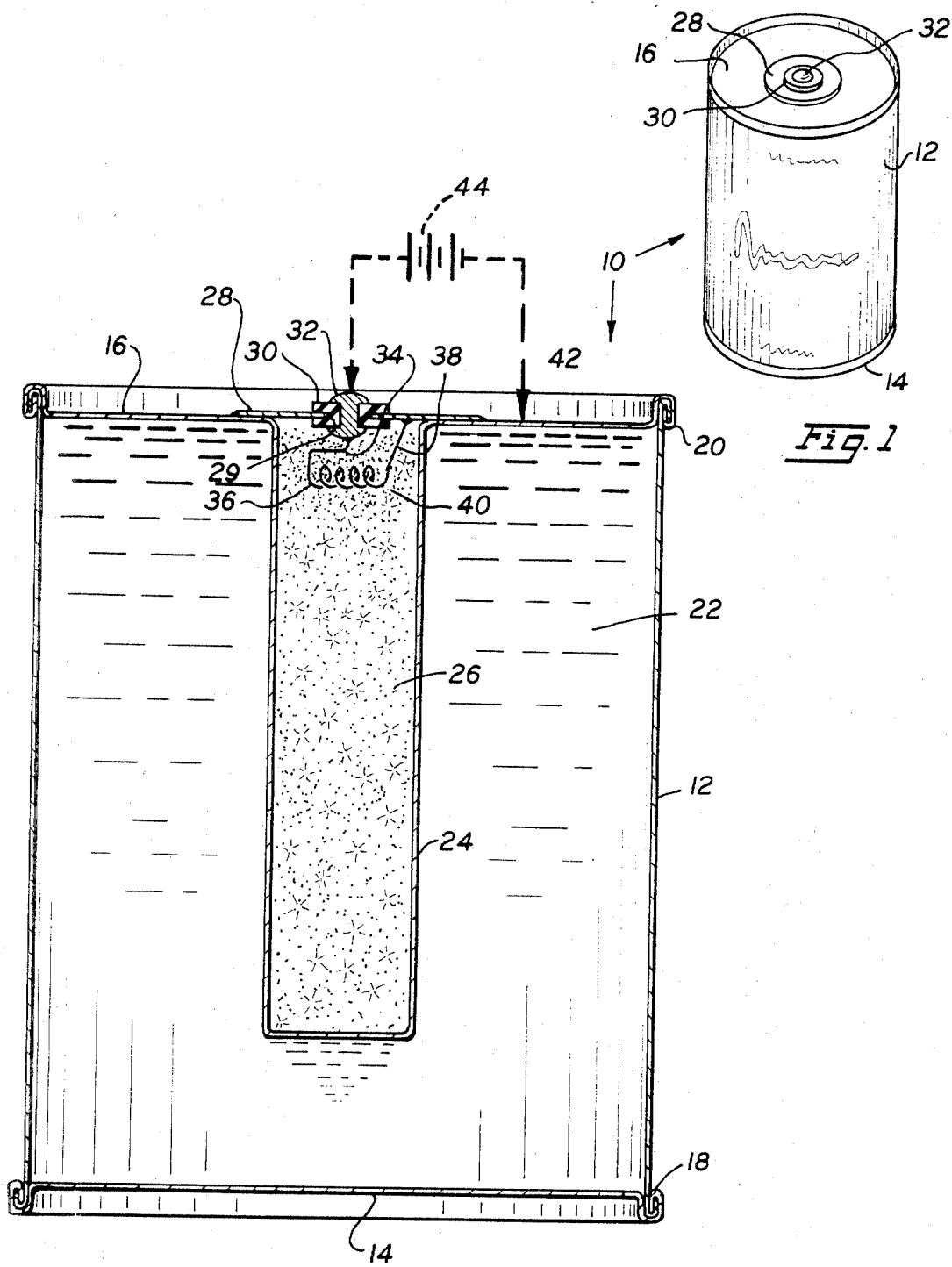
FIG. 1 is a perspective view of the self-heating food container of the present invention and, FIG. 2 is a vertical sectional view through the center of FIG. 1 with an electric circuit indicated at the top of the container depicted by broken lines.

The self-heating food container of the present invention is depicted in FIGS. 1 and 2 in the form of an hermetically sealed cylindrical can generally identified 10 having a metal side wall 12, a metal bottom 14, and a metal top 16. The periphery of the bottom 14 is crimped around the lower sidewall 12 and soldered thereto to form a joint 18. Similarly the periphery of top 16 is crimped around the top of sidewall 12 and soldered thereto to form a joint 20. The container 10 may be packed with a liquid containing food product 22 to be heated.

The metal top 16 contains a deep drawn heating well 24 that is unitary and integral therewith. Although the combined well 24 and top 16 may be fashioned in any convenient manner, it has been found that when the same is deep drawn from a flat blank a fluid-tight imperforate cover 16 results. The well 24 defines a housing that is packed with an aluminothermic mixture 26 which when reacted provides the heat necessary to heat the food 22 sealed in container 10.

The well 24 is closed by a top 28 which is a plate of sheet metal with a central opening 29. The central opening 29 of the top 28 is surrounded by a substantially H-shaped insulator 30 which surrounds and fixedly supports a metal rivet defining a lead 32. The inner portion of the lead 32 is electrically joined, as by soldering, to a lead 34 which defines a terminating leg of a filament 36. The other end or leg of the filament 36 is also electrically connected or soldered to the covering top 28 through a lead 38. The well 24 is sealed closed about the peripheral portion of the covering top 28 that is soldered or otherwise secured to the upper surface of the top 16.

The aluminothermic mixture 26 shown in FIG. 2 is composed of a homogeneous mixture of aluminum powder and barium chromate that substantially fills the well 24. In practice, the filament 36 is placed in intimate contact with a starter mixture 40 of approximately five parts barium chromate to approximately one part boron powder in which the preferred size of the particles in three-tenths of a micron, but may range in size from one-tenth to seven-tenths of a micron. The starter mixture 40 is positioned in the well 24 adjacent the filament 36. The amount of starter mixture 40, in intimate contact with the filament 36, is comparatively small but sufficient to ensure its reaction by the filament when the same is heated. Again, practice has shown that not too great an amount of starter mixture 40 need be packed about the filament. Thus, when the starter mixture 40 is heated by the filament 36, it, in turn, easily and rapidly reacts with the mixture 26, therefore some of the mixture 26, which is mixed with the starter mixture 40, produces the desired ignition.

The application of even a relatively small electromotive force, e.g. 1.5 or 3 volts, across the lead 32 and any portion of the top in electrical contact with lead 38, e.g. point 42, as shown by the connection of the battery 44, causes the high resistance filament 36 to become very hot. Because the intimately packed starter mixture 40 reacts readily, and because it is in immediate contact with the mixture 26, it causes ignition of the aluminothermic mixture 26. Thus, there occurs a rapid chain action that results from heating the easily reacted starter mixture 40 in direct contact with said filament 36 and using its reaction to cause the reaction of the mixture 26 that requires a heat greater and of longer duration than that produced by the filament 36.

The self-heating container 10 of the present invention may be prepared from a variety of materials commonly used in can manufacture, such as tin coated sheet steel, aluminum, plastics, and composites formed from paper and/or metal foil and/or plastics. For convenience in forming the well containing the aluminothermic mixture, it is preferred that the well should be deep drawn from a single piece of metal, preferably steel, aluminum, or copper. The well wall should be of sufficient thickness so that the aluminothermic reaction will not cause it to overheat and break. Its surface should be uniform and uninterrupted in extent since it has been found that when the same is non-uniform or is provided with bends and ledges, the ignition of the mixture 26 is uneven and difficult to control.

The metal filament used for initiating the ignition of the aluminothermic mixture is a filament of high electrical resistance. It is preferably a tungsten filament or a nickel-chromium alloy such as that sold under the trademark "Nichrome." The filament 36 should have sufficient resistance so that it will reach high temperatures with the application of relatively low voltages, such as 1.5 or 3 volts.

The aluminothermic mixture, which is essentially a homogeneous mixture of aluminum powder and a chromate, such as lead chromate or one of the alkaline earth metal chromates, and preferably barium chromate, may also contain boron powder as part of the homogeneous mixture. The metal powder particles utilized are very small, with the boron being preferably of a very fine particle size, e.g. from less than one micron to about 10 microns. The aluminothermic mixture once ignited, reacts exothermically and is self-propagating. As noted, for best results, the well should have a uniform cross-section so that the packing of the aluminothermic mixture in it should not be interrupted. Although wells having square or rectangular cross-sections meet these criteria, the well is preferably round or oval in cross-section to facilitate manufacture.

The desired degree of heat necessary to heat the food in the container will vary for different size packages and different foods and their fluid content. The heat output may be controlled by the size of the well and the amount of the aluminothermic mixture. It may also be controlled and particularly modulated by including diluents in the mixture. Since the aluminum and boron react stoichiometrically with the chromate, the heat output may be modulated by including an excess of one of the reactants. The percentage of aluminum plus boron is generally between about 10 and 30 percent with the preferred range being about 16 and 22 percent, based on 100 weight percent total of aluminum, boron and chromate. The rate of heating will vary directly with the particle size of the components of the aluminothermic mixture.

The operation of the self-heating container of the present invention is illustrated by the following: 12 ounce cans were prepared from tin plated sheet steel and from aluminum sheet. The top and wells were formed from copper sheet having a thickness of about one thirty-second inch. The completed can was constructed as illustrated in FIGS. 1 and 2. The filament was a tungsten filament one-eighth inch long having a resistance of between one and two ohms. The well was packed with 25 grams of an aluminothermic mixture being about 20 percent of fine aluminum powder with 80 percent barium chromate (percent by weight). The filament was coated with the starting mixture 40 having a particle size of between .1 and .7 of a micron. In order to provide the desired fine coating or layer of starting mixture about the filament 36, the filament may be dipped in a glue or other adhesive and then dipped into the starting mixture to permit a thin residue to adhere to it.

The well displaced a little more than 1½ fluid ounces. The can was filled with bouillon. A 1.5 volt battery was applied across the two leads as illustrated in FIG. 2. At the end of two minutes the contents of the can had been heated from room temperature to a high temperature approaching boiling.

The aluminothermic reaction that occurs in the well 24 as a result of the ignition of the mixture 26 is substantially smokeless. It is also performed without creating any increase of pressure within the well 24. Hence, there is no fear of a buildup of pressure within the well, and, therefore, there is no problem with respect to the ability of the well to contain the reaction and prevent it from expanding into the remainder of the container and the food contents 22 thereof. However, in order to prevent contamination of the food product 22 in the container at the outset of packaging, it is desirable to provide the well or housing 24 be of unitary and imperforate construction, to thereby separate the food product 22 from contact with the contamination by the contents of the mixture within the well 24.

In most cases heating of food will occur most rapidly and uniformly when the food is liquid such as soup. Other foods packed in liquids are readily heated in the self-heating container of the present invention. Solid foods may also be heated so long as there is adequate heat conduction.

As many embodiments of this invention may be made without departing from the spirit and scope thereof, it is to be understood that the invention includes all such modifications and variations as come within the scope of the appended claims.

I claim:

1. A self-heating container comprising:
   a sealed container;
   a closed housing in said container;
   a mixture reactable in said housing for producing an exothermic reaction;
   a metal filament in said housing;
   said filament having a plurality of leads connected with an accessible external surface of said container;
   a starter mixture including boron powder about said filament and in contact with said reactable mixture whereby when an electrical potential is applied to said filament leads at said accessible surface of said container said filament is heated to heat said boron powder starter mixture and reactable mixture to cause the same to ignite and exothermically react in said closed housing;
   said ignitable mixture comprising aluminum powder and a reducible chromate compound which reacts exothermically with said aluminum powder;
   said boron powder starter mixture about said filament being immediately adjacent to and in contact with said filament for reaction thereby and to ignite said ignitable mixture with which the same is in contact; and
   said boron powder starter mixture in contact with said filament being adhered thereto.

2. A self-heating container as in claim 1:
   said mixtures being sealed in said housing and producing a smokeless, pressureless exothermic reaction therein upon ignition.

3. A self-heating container comprising:
   a container having a plurality of electrically conductive surfaces thereon, said container being hermetically sealed to contain a food product therein;
   said container including a housing;
   an ignitable mixture sealed in said housing for producing a smokeless and pressureless exothermic reaction therein;
   a metal filament in said housing extending into said mixture, said filament having one end thereof connected in electrically conductive relation with one of said conductive surfaces and another end of said filament being connected in electrically conductive relation with another of said conductive surfaces; and
   a coating of a starter mixture including boron powder adhered to and in immediate contact with said filament whereby when a voltage is applied across said conductive surfaces said filament is heated to cause said boron powder mixture and said ignitable mixture to produce a smokeless, pressureless exothermic reaction in said housing to heat the food product in said container.